United States Patent

[11] 3,581,823

| [72] | Inventor | David G. Feuerbacher |
| | | Bellaire, Tex. |
| [21] | Appl. No. | 836,160 |
| [22] | Filed | June 24, 1969 |
| [45] | Patented | June 1, 1971 |
| [73] | Assignee | Texaco Inc. |
| | | New York, N.Y. |

[54] RECOVERY OF HYDROCARBONS FROM SUBTERRANEAN HYDROCARBON-BEARING FORMATIONS
17 Claims, No Drawings

[52] U.S. Cl............................................. 166/267,
166/268, 166/274, 208/11
[51] Int. Cl.......................................................E21b 43/22,
C10g 1/00
[50] Field of Search............................................ 166/265,
266, 267, 268, 274, 275, 273, 305, 306, 307;
208/11; 252/8.55 (D)

[56] References Cited
UNITED STATES PATENTS

| 1,651,311 | 11/1927 | Atkinson...................... | 208/11X |
| 1,820,917 | 9/1931 | Langford et al. ............ | 208/11 |
| 2,204,223 | 6/1940 | Lawton et al.................. | 252/8.55UX |
| 2,288,857 | 7/1942 | Subkow........................ | 166/267X |
| 2,742,089 | 4/1956 | Morse et al. .................. | 166/273 |
| 3,107,726 | 10/1963 | Greenwald .................... | 166/266 |
| 3,279,538 | 10/1966 | Doscher ........................ | 166/274X |
| 3,330,344 | 7/1967 | Reisberg........................ | 166/273X |
| 3,392,105 | 7/1968 | Poettmann et al............ | 208/11 |
| 3,482,631 | 12/1969 | Jones............................. | 166/273 |
| 3,490,532 | 1/1970 | Carlin............................ | 166/274 |

*Primary Examiner*—Stephen J. Novosad
*Attorneys*—K. E. Kavanagh and Thomas H. Whaley ABSTRACT: A process for the recovery of hydrocarbons from subterranean hydrocarbon-bearing formations by the treatment of the formation with an aqueous medium containing an alkali metal hydroxide and a low molecular weight amine.

RECOVERY OF HYDROCARBONS FROM SUBTERRANEAN HYDROCARBON-BEARING FORMATIONS

FIELD OF THE INVENTION

This invention relates to an improved process for the recovery of hydrocarbons from hydrocarbon-bearing formations. The process of this invention is particularly useful for increasing the recovery of low-gravity crude oils, oil from tar sands, and residual crudes in hydrocarbon-bearing formations, and is especially useful for recovery of residual hydrocarbons from formations from which varying amounts of the more mobile fractions of the original hydrocarbons in place have been recovered.

DESCRIPTION OF THE PRIOR ART

The production of petroleum from subterranean hydrocarbon-bearing formations is usually accomplished by drilling into a hydrocarbon-bearing formation and utilizing one of the well-known recovery methods such as water flooding, solvent flooding, and steaming for the recovery of hydrocarbons. However, these methods may recover only a minor portion of the petroleum products present in the formation, and may leave up to 70 to 80 percent of the original hydrocarbons in place, particularly when applied to formations containing low-gravity crudes (less than 25° API), and oils from tar sands.

Of the improved recovery methods which permit additional recovery of hydrocarbons from partially depleted formations, water flooding is one of the more widely practiced processes. Although a successful water flood may result in recovery of 30 to 50 percent of the original hydrocarbons left in place, generally, the application of water flooding to heavy crudes results in much lower recoveries.

Newer developments in recovery methods for heavy crudes have included the use of steam flooding which has resulted in significant recoveries in some areas of heavy crude reservoirs.

In addition process modifications have been developed that incorporate additives to improve the efficiency of both water flooding and steaming processes which include the use of surface-active agents and miscible liquids that decrease the interfacial tension between the water and the reservoir crude.

Additives to improve the wettability characteristics of the formation, may be also used. For example, a dilute alkaline aqueous solution with or without surfactants is known to increase the wetting characteristics of sand surfaces, and promote a leaching action and emulsification of the tarry materials resulting in improved recovery.

However, in many instances the increase in recovery resulting from the application of these additive recovery processes to subterranean formations, have been considerably less than estimated recoveries particularly in those formations containing low-gravity crudes, where recovery has been only minimal because of the nature of the crude and the strong association between its components and the surfaces of the sand formation.

SUMMARY

This invention comprises displacing the hydrocarbons in a subterranean hydrocarbon-bearing formation or the oil in tar sands with an aqueous medium containing an alkali metal hydroxide and a low molecular weight amine.

DESCRIPTION OF THE PREFERRED EMBODIMENT

More specifically, it has been found that when an aqueous medium containing an alkali metal hydroxide, and a low molecular weight amine, such as n-butylamine, is contacted with a hydrocarbon-bearing formation improved recovery or extraction of low-gravity hydrocarbons from sands is obtained.

Briefly, the method of the invention can be utilized as an improved water flood wherein the aqueous medium, containing the alkali metal hydroxide and the low-molecular weight amine, is employed as the flooding agent. Alternately, the method of invention may be utilized by the injection into a subterranean hydrocarbon-bearing formation via an injection well of a slug of the heretofore described aqueous medium, and thereafter injecting a drive agent, e.g., $H_2O$ as water or steam, so as to drive the slug toward a producing well, from which the hydrocarbon is produced. In yet another application, the aqueous medium containing the alkali metal hydroxide and the low-molecular weight amine can be used in an extractive technique in conjunction with mined tar sands.

It is known that low-gravity crudes usually contain a high percentage of asphaltenes. It is believed that the beneficiating results of the aqueous medium containing the alkali metal hydroxide and the low-molecular weight amine, such as n-butylamine, are derived from the wettability-improving characteristic of the alkaline medium and the desorption effectiveness of the amine whereby the crude is effectively desorbed from the formation matrix and emulsified in the basic aqueous medium, leading to improved recovery. The alkali metal hydroxide, serves not only to improve the wettability characteristics of the aqueous medium, but also improves the stability of the resulting oil-in-water emulsion.

The base is selected from the group consisting of the hydroxides of sodium and potassium and mixtures thereof, and is used in a concentration in the range of about 0.001N to 1.0N.

The low molecular weight amine which may be used for this process includes amines having the formula:

wherein $R_1$, $R_2$ and $R_3$ are alkyl groups of from one to 12 carbons or hydrogen and where the total number of carbons in the R groups is less than 13 and at least one of said R groups being alkyl. Concentrations of from about 0.05 percent to about 1.5 percent by volume are sufficient, but amounts outside this range may be employed if desired.

Illustrative of the invention, test runs were made in which an aqueous medium composed of a 0.1N aqueous solution of sodium hydroxide, and containing 0.5 percent by volume of n-butylamine was passed through a pack of 50—60 mesh glass beads containing a heavy crude (11° API) at an oil saturation of approximately 30 percent. Initially, three pore volumes of the displacing medium were passed through the pack during which time the displaced oil and effluent displacing medium were collected and the amount of displaced or extracted oil determined. The flood was then continued until either no more oil was displaced or until a total of 20 pore volumes of the displacing medium (including the first three) had been passed through the pack.

The following tables shows that improved oil recovery was obtained by the method of this invention. The presence of n-butylamine resulted in about six times more recovery than that obtained using the sodium hydroxide solution in the absence of a low molecular weight amine. In a second test, the presence of trimethylamine resulted in about eight times more recovery than that obtained using the sodium hydroxide solution alone.

| Additive | Substituted nitrobenzene conc. percent by vol. | Oil recovered (grams), after 3 pore volumes thru pack | Total oil recovered (grams) | Total percent recovery |
|---|---|---|---|---|
| 1. Distilled water | None | None | None | 0 |
| 2. 0.1 N aqueous NaOH | | 0.19 | 0.24 | 3.1 |
| 3. n-Butylamine* | 0.5 | 0.50 | 1.78 | 20.3 |
| 4. Trimethylamine* | 1.0 | 1.40 | 1.48 | 25.3 |

*In Runs 3 and 4, the amines were contained in 0.1 N aqueous NaOH.

In a preferred embodiment of the method of this invention, an injection well is drilled into a subterranean hydrocarbon-bearing formation through which a slug of the aqueous medium containing the alkali metal hydroxide and the low molecular weight amine as described above is injected into the formation. The slug is then followed by a subsequently injected aqueous drive agent, e.g., water. The size of the slug injected may vary within relatively wide limits, and will depend on a number of conditions, including the thickness of the formation, its characteristics, and the conditions for the subsequent injection of the aqueous drive medium. The aqueous drive agent may be $H_2O$ in the form of either water or steam, the temperature of which may range up to 500° F.

In the passage of the aqueous medium through the subterranean hydrocarbon-bearing formation, hydrocarbons are desorbed from the formation, forming an oil-in-water emulsion which is then produced at production wells. Separation of the hydrocarbons from the emulsion is accomplished by one of several known emulsion breaking techniques.

Another embodiment of the method of this invention is illustrated in its application to the recovery of hydrocarbon materials from tar sands utilizing the aqueous medium in an extractive technique in combination with well-known techniques for the mining of the tar sand, and well-known techniques for the recovery of the oil from the tar sand following its extraction.

It will be apparent from the foregoing description that the process is subject to other modifications without departing from the scope of the invention as defined in the following claims.

I claim:

1. A process for recovering hydrocarbons from a subterranean hydrocarbon-bearing formation which comprises contacting said formation with an aqueous medium containing an alkali metal hydroxide and a low molecular weight amine of the formula:

$$R_2-\underset{R_3}{\underset{|}{\overset{R_1}{\overset{|}{N}}}}$$

wherein $R_1$, $R_2$, and $R_3$ are alkyl groups of from one to 12 carbons or hydrogen and where the total number of carbons in the R groups is less than 13 and at least one of said R groups being alkyl and in amount in the range of from about 0.05 percent to about 1.5 percent by volume sufficient to reduce the sorptive capacity of said formation for said hydrocarbons and enhance the mobility thereof, thereby forming an emulsion of said hydrocarbons in said formation and said aqueous medium, recovering the emulsion thus formed, and separating hydrocarbons from said emulsion.

2. The process of claim 1 wherein said alkali metal hydroxide is selected from the group consisting of the hydroxides of sodium, potassium, and mixtures thereof.

3. The process of claim 2, wherein said base is contained in the aqueous medium in concentrations in the range of from about 0.001N to 1.0N.

4. The process of claim 1 wherein said low molecular weight amine is n-butylamine.

5. The process of claim 1 wherein said low molecular weight amine is trimethylamine.

6. A process for recovering hydrocarbons from a subterranean hydrocarbon-bearing formation penetrated by an injection well and a production well, which comprises injecting into said formation through said injection well an aqueous medium containing an alkali metal hydroxide and a low molecular weight amine of the formula:

$$R_2-\underset{R_3}{\underset{|}{\overset{R_1}{\overset{|}{N}}}}$$

wherein $R_1$, $R_2$, and $R_3$ are alkyl groups of from one to 12 carbon atoms or hydrogen and where the total number of carbons in the R groups is less than 13 and at least one of said R groups being alkyl and in amount in the range of from about 0.05 percent to about 1.5 percent by volume sufficient to reduce the sorptive capacity of said formation for said hydrocarbons and enhance the mobility thereof, and thereafter injecting an aqueous drive medium into said formation through said injection well and driving the same toward said production well.

7. The process of claim 6, wherein said alkali metal hydroxide is selected from the group consisting of the hydroxides of sodium, potassium, and mixtures thereof.

8. The process of claim 7, wherein said alkali metal hydroxide is contained in the aqueous medium in concentrations in the range of from about 0.001N to 1.0N.

9. The process of claim 6 wherein said low molecular weight amine is n-butylamine.

10. The process of claim 6 wherein said low molecular weight amine is trimethylamine.

11. The process of claim 6 wherein said aqueous drive medium is $H_2O$.

12. The process of claim 11 wherein the $H_2O$ is water, steam, and mixtures thereof, the temperatures thereof being fixed by optimum conditions of operation.

13. A process for recovering hydrocarbons from a hydrocarbon-bearing sand matrix having heretofore undergone mining processing, which comprises contacting said hydrocarbon-bearing sand matrix with an aqueous medium containing an alkali metal hydroxide and a low molecular weight amine of the formula:

$$R_2-\underset{R_3}{\underset{|}{\overset{R_1}{\overset{|}{N}}}}$$

wherein $R_1$, $R_2$, and $R_3$ are alkyl groups of from one to 12 carbons or hydrogen and where the total number of carbons in the R groups is less than 13 and at least one of said R groups being alkyl, in the range of from about 0.05 percent to about 1.5 percent by volume thereby forming an emulsion of said hydrocarbons in said sand matrix and said aqueous medium, recovering the emulsion thus formed, and separating hydrocarbons from said emulsion.

14. The process of claim 13 wherein said alkali metal hydroxide is selected from the group consisting of the hydroxides of sodium, potassium, and mixtures thereof.

15. The process of claim 14, wherein said base is contained in the aqueous carrier in concentrations in the range of from about 0.001N to 1.0N.

16. The process of claim 13 wherein said low molecular weight amine is n-butylamine.

17. The process of claim 13 wherein said low molecular weight amine is trimethylamine.